Aug. 23, 1955 W. H. WIRKLER 2,715,995
AUTOMATIC TRACKING APPARATUS
Filed July 19, 1950 4 Sheets-Sheet 1

INVENTOR.
WALTER H. WIRKLER
BY
ATTY.

United States Patent Office 2,715,995
Patented Aug. 23, 1955

2,715,995

AUTOMATIC TRACKING APPARATUS

Walter H. Wirkler, Cedar Rapids, Iowa, assignor to Collins Radio Company, Cedar Rapids, Iowa, a corporation of Iowa Application July 19, 1950, Serial No. 174,697

6 Claims. (Cl. 235—61)

This invention relates in general to automatic position trackers, and in particular to apparatus for instantaneously computing the $x$ and $y$ positions of a moving body with respect to a pair of axes.

One of the problems of marine and air navigation is to know at all times the exact or approximate position of the moving craft. The early mariners approached this problem by periodically obtaining position fixes either by the use of celestial navigation or by observing landmarks when they were visible. Between fixes dead reckoning was used, which took into account the ship's speed relative to the water and the estimated or known currents. As each fix was obtained, the dead reckoning position was corrected to correspond with this fix and the average current could be corrected from two adjacent fixes. The same procedure may be used in air navigation. Generally the position fixes are determined by radio and dead reckoning is used between the rather infrequent fixes. If position fixes are continuously obtained from radio, no dead reckoning is required and the pilot knows instantaneously where he is. At present there is no radio equipment available which will continuously give the aircraft's position with great accuracy. With the equipment now available, fixes obtained from radio are in error and these errors are of relatively high frequency due to the swift motion of the aircraft.

This invention is an outgrowth of my work in aircraft course stabilizing means which is described in detail in Patent No. 2,548,278, which issued on April 10, 1951, and is entitled Aircraft Course Stabilizing Means.

It is an object of this invention, therefore, to utilize radio information when it is available and to correct the errors present by the use of information obtained from flight instruments carried on the aircraft. At times when no radio information is received, dead reckoning will be used.

A further object of this invention is to provide an automatic position tracker which instantaneously presents to the pilot of a moving craft the $x$ and $y$ positions of the craft relative to reference coordinate axes.

Another object of this invention is to provide an automatic position tracker which will utilize radio information when it is available and will correct the high frequency perturbations present in the radio with information obtainable from flight instruments carried on the aircraft.

Yet another object of this invention is to provide an automatic position tracker which will perform dead reckoning for the pilot and navigator at times when there is no satisfactory radio information available.

Further objects, advantages, and features of this invention will become apparent from the following description and claims when read in view of the drawings, in which:

Figure 1:
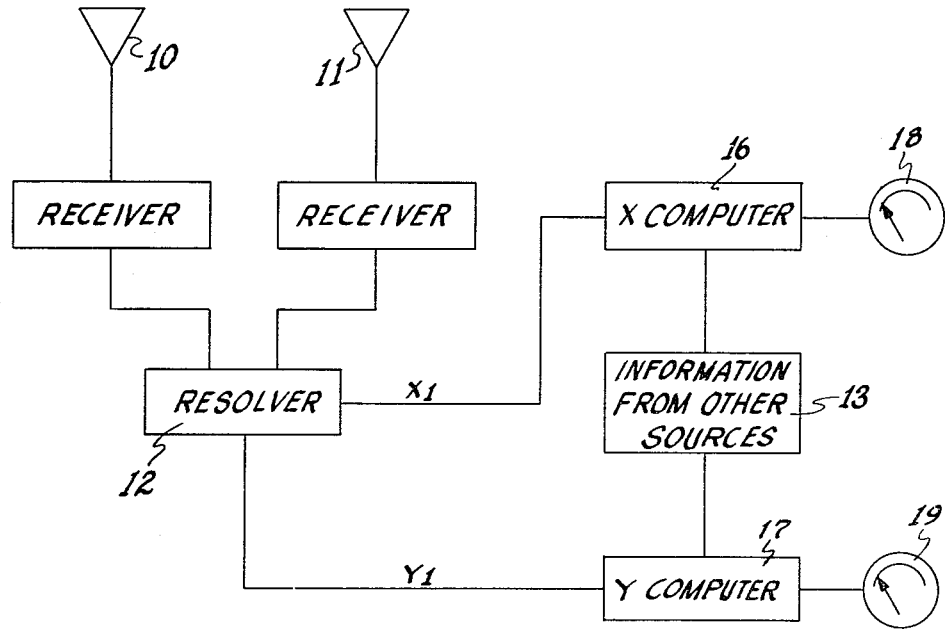
Figure 1 is a schematic illustration of the position tracker of this invention showing the $x$ and $y$ computers.

Figure 1 illustrates a computer which will automatically and continuously present to the pilot his position. This presentation may be in the form of rectangular $x$ and $y$ coordinates with respect to a pair of reference axes. Antennas 10 and 11 receive radio information from two stations and the radio information is resolved into $x$ and $y$ coordinates by the resolver designated generally as 12. There are many kinds of resolvers and the type used does not affect the present invention. The law of sines is well known to those acquainted with trigonometry and allows the trigometric problem where two angles and the included side of a triangle are known to be solved.

The antenna 10 determines the direction from the aircraft to one transmitter and the antenna 11 determines the direction to a second transmitter. If the distance between the two transmitters is known, a radio fix may be obtained. A radio fix may also be obtained by using only one ground transmitter if distance intelligence is also received. In this case the direction and distance to a known geographic position give a radio fix. The solution of these problems may be done by a human navigator or by a resolver. For a detailed description of trigometric resolvers reference may be had to the following patents: Agins 2,465,624 and Agins 2,467,646.

The $x$ and $y$ coordinate positions obtained from the resolver 12 normally contain high frequency errors due to the perturbations in the radio signals. The high frequency errors in the radio signal are due to static and other disturbances which are caused by geographical conditions and atmospheric conditions. An inaccurate position signal is caused by these factors. However, the low frequency components of the radio signal are good. As described in Patent No. 2,548,278, previously referenced, one of the features of my invention is the basic idea, not previously found in the art of obtaining a corrected signal more accurate than is possible from any one source by selecting the best frequency components from various sources and combining them to obtain the new, corrected signal. The mathematical theory behind this plan is described in the above referenced patent. In aircraft navigation the radio signal from a radio beam is very accurate in determining the landing or cross country courses if considered on an average basis. Stated otherwise, although there will generally be static and disturbances which cause the radio beam to move rather rapidly about the true position, if the signal is integrated over a relatively long time the radio signal will be very good. This is the meaning of the phrase "low and high frequency signals." The low frequency components of radio are good, but the high frequency components are no good. On the other hand, the air speed signal derived from the compass and air speed indicator is good in the high frequency components and is in error only by an amount proportional to the wind. The wind is a slowly varying factor, and if only the high frequency or mid-frequency components are selected from this source, the signal will be good. In the same manner, the bank angle of an airplane is proportional to acceleration and a pick-off from the bank gyro gives an instantaneous signal proportional to the aircraft's acceleration. Thus, the high frequency components of a signal obtained from a bank gyro would be very good.

The apparatus of this invention combines these signals and weighs them so as to obtain the best frequency components from each signal source. It is to be remembered that displacement, velocity, and acceleration are all related as different derivatives of displacement with respect to time. Thus, unless vastly superior radio equipment is provided, the direct use of these radio coordinates does not give satisfactory results. The output of the resolver designated as $x_1$ is the $x$ coordinate position and $y_1$ is the $y$ coordinate.

In the specification the following designations will be used:

The subscript 1 indicates that a signal is derived from radio information.

The subscript 2 indicates that a signal is derived from the compass and true airspeed flight instruments.

The subscript 3 indicates a reconstructed signal in which the low frequency components have been derived from radio signals and the high frequency components from flight instruments.

A dot (·) above a character indicates that the signal is the first time derivative of the corresponding signal.

It is to be understood that the reference axes are set into the resolver at the same time that the stations being used are chosen. Thus if these $x$ and $y$ coordinates were accurate, the pilot would know his geographic position.

The present invention relates to apparatus which, when furnished with $x_1$ and $y_1$ coordinates obtained from radio, will correct them by adding supplemental information obtainable from flight instruments, designated generally as 13, carried on the aircraft to give a corrected and more accurate position. An $x$ computer 16 and a $y$ computer 17 compute corrected $x_3$ and $y_3$.

Figure 2:
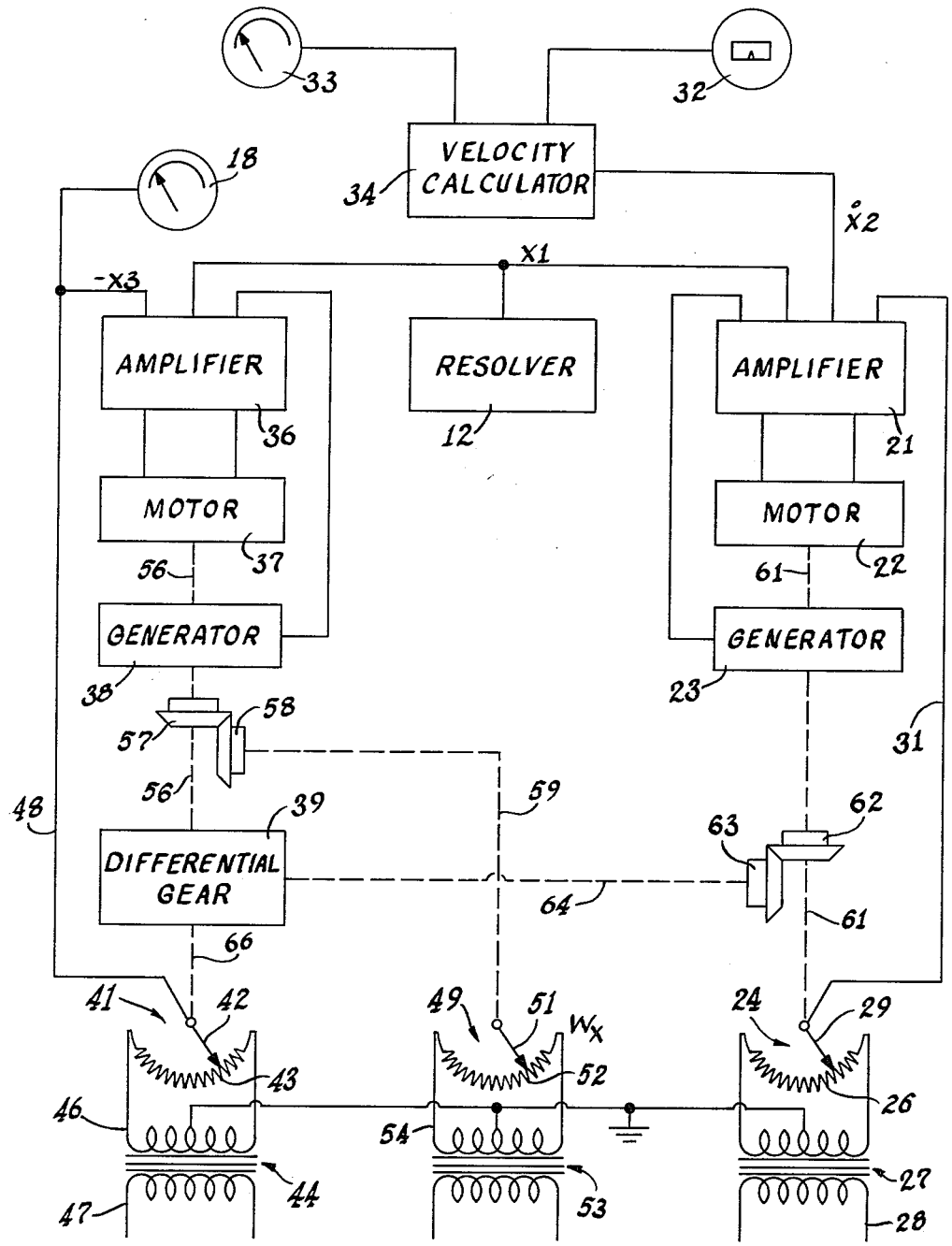
Figure 2 is a detailed schematic view of the $x$ computer when radio information is available.

The $x_3$ and $y_3$ outputs may be presented to the pilot on the meters 18 and 19, respectively, or may be furnished to an automatic course computer which uses the position information to automatically maintain the aircraft on a predetermined course. Since the automatic course computer does not constitute a necessary part of this invention, the visual presentation of the $x_3$ and $y_3$ coordinates will be described. The apparatus for obtaining the corrected $x_3$ coordinate is designated generally as 16 and, as best shown in Figure 2, comprises an amplifier 21 which receives a signal proportional to $x_1$ from the resolver 12. The amplifier 21 furnishes an output to a motor 22 which is mechanically linked to a rate generator 23 and a potentiometer 24. Potentiometer 24 comprises the resistance 26 connected in series with one side of a transformer 27 which has its mid-point grounded. An alternating current source is connected to the other winding 28 of the transformer to provide an exciting voltage. The output of the generator 23 is fed back to the motor amplifier and the voltage from the potentiometer contact 29 is returned by the lead 31 to the amplifier. Also supplied to the input of the amplifier is a signal $\dot{x}_2$ proportional to the aircraft's air speed in the $x$ direction. This signal is obtained from the compass 32 and the air speed indicator 33 by means of a calculator 34 of a type well known to those skilled in the art. The air speed indicator gives the airplane's forward velocity with respect to the surrounding air and the compass gives the aircraft's heading. A suitable calculator can change this information into a velocity in the $x$ direction. Such resolvers utilize the principle of resolving a vector into two components ninety degrees apart and will not be discussed or described in detail herein.

A second amplifier 36 furnishes an output to a second servomotor 37 which is mechanically connected to a rate generator 38. The electrical output of the generator 38 is fed back to the amplifier 36. A differential gear train 39 is mechanically connected to the motor 37 and also to a potentiometer 41. The potentiometer 41 comprises the movable contact 42 and the resistance 43 in series with one winding of a transformer, designated generally as 44. The mid-point of the winding 46 is grounded and a suitable alternating current supply is furnished to the other winding 47. A conductor 48 connects the contact 42 to the input of the amplifier 36. A third potentiometer 49 comprises a movable contact 51 and the resistor 52 connected in series with the transformer 53. The midpoint of the winding 54 is grounded and a suitable alternating supply is furnished to the other winding of the transformer. An $x_1$ signal obtained from the resolver 12 is also fed to the amplifier 36.

The shaft of motor 37 is designated as 56 and drives a generator 38 and furnishes an input to the differential gear 39. A gear 57 is mounted on the shaft 56 and meshes with a one to one gear 58 which is mounted on a shaft 59. The shaft 59 is also connected to the movable contact 51. A shaft 61 connects the motor 22 with the generator 23 and extends to move the contact 29. A gear 62 is mounted on the shaft 61 and meshes with a one to one gear 63 carried on a shaft 64. The shaft 64 also furnishes an input to the differential gear 39. The differential gear 39 adds the input of shaft 56 to that of shaft 64 and furnishes the output to a shaft 66. The shaft 66 drives the contact 42.

It will now be shown that the electrical output of potentiometer 41 is equal to a corrected $x_3$ displacement. It should be remembered that the information furnished to the computer is an $x_1$ signal obtained from radio and an $\dot{x}_2$-velocity signal obtained from compass and air speed. The $\dot{x}_2$ velocity furnished to the computer was in error by the amount of wind because the air speed indicator indicates the speed relative to the surrounding air and not the speed relative to ground. For explanatory purposes, the electrical filters of Figures 5 and 6 will be used. For a more complete explanation, reference may be had to my co-pending application on Aircraft Course Stabilizing Means, Serial No. 110,826, filed August 17, 1949.

Figure 5:
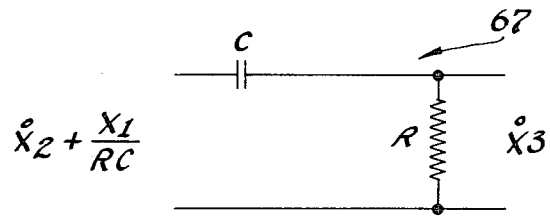
Figure 5 is a wiring diagram of a high-pass filter.
Figure 6:
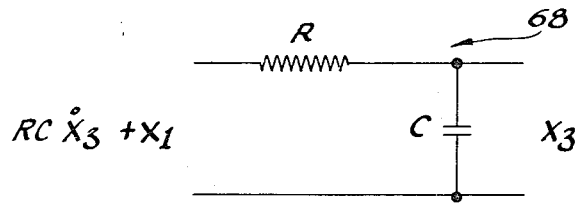
Figure 6 is a schematic diagram of a low-pass filter.

If the filter of Figure 5 is supplied a signal $\dot{x}_2$ proportional to the $x$ component of air speed derived from flight instruments and a signal $$\frac{x_1}{RC}$$

where $x_1$ is the radio-derived $x$ coordinate, and R and C are respectively the resistance and capacitance of the filter, the output will be a velocity signal, $\dot{x}_3$. The high frequency components of velocity $\dot{x}_3$ are obtained from the $\dot{x}_2$, and the low frequency component from $x_1$. The velocity error in the signal $\dot{x}_2$ is mostly due to the $x$ component of wind. If the wind is steady or only changing slowly, the wind velocity in the $x$ direction may be represented as direct current or very low frequency alternating current, and since low frequency components are attenuated and direct current components blocked out entirely from the filter, the wind error present in the signal $\dot{x}_2$, is essentially absent in the output signal $\dot{x}_3$. If a signal proportional to RC $\dot{x}_3$, derived from the filter of Figure 5, is now applied to the low pass filter of Figure 6 along with another signal proportional to $x_1$, the output of the filter will be the desired reconstructed $x_3$, without error due to constant wind and with high frequency errors due to fluctuations in the radio attenuated.

The analogy between electrical high and low pass filters and servo mechanisms can be shown mathematically. A servomotor is analogous to a low pass filter. This can be illustrated by considering the following example. If the motor input is a direct current signal, the motor will operate at constant speed. If the applied voltage to the motor fluctuates, the speed of the motor will vary with the fluctuations up to a certain frequency. Above a certain frequency, the inertia of the motor is such that the shaft output will not be proportional to the input voltage. It is seen that this results in filter action. A very rapidly fluctuating signal applied to a servomotor will produce a shaft output much smoother than the input signal.

To prove mathematically that a servomotor is analogous to a low pass electrical filter, let us consider the servo mechanism shown in Figure 2 comprising amplifier 21, motor 22, and generator 23. A first equation may be written:

(1) $$K_1 = \frac{\dot{\theta}_0}{E}$$

where $K_1$ is the transfer function of the amplifier 21, $\dot{\theta}_0$ is the speed of the motor shaft, and E is the error signal supplied to the amplifier, as for example in Figure 2 the signals $x_1$ and $\dot{x}_2$.

(2) $$K_2 = \frac{E_{rg}}{\dot{\theta}_0}$$

where $K_2$ is the loop gain between the generator output and the input to the amplifier 21, and $E_{rg}$ is the feedback voltage from the rate generator 23.

(3) $$K_3 = \frac{e_p}{\theta_0}$$

where $K_3$ is the transfer function of the feed-back signal from potentiometer 27, $e_p$ is the feed-back voltage from the contact 29 through the lead 21, and $\theta_0$ is the position of the shaft 61.

The error signal E may be also defined by the equation:

(4) $$E = x_1 + \dot{x}_2 - K_2 \dot{\theta}_0 - K_3 \theta_0$$

This equation is obtained by summing voltages fed to amplifier 21.

Let $x_1 + \dot{x}_2 = x_3$.

Solve Equation 4 for $\dot{\theta}_0$.

(5) $$\dot{\theta}_0 = K_1 [x_3 - K_2 \dot{\theta}_0 - K_3 \theta_0]$$

or (6) $$[(1+K_1K_2)p + K_1K_3]\theta_0 = K_1 x_3$$

where $p$ is the Laplace transform.

(7) $$\frac{\theta_0}{x_3} = \frac{\frac{1}{K_2}}{\left[\frac{1+K_1K_2}{K_1K_3}\right]p+1}$$

(8) $$\theta_0 = \frac{e_p}{K_3} \text{ from Equation 3}$$

Substituting Equation 8 into Equation 7, (9) $$\frac{\frac{e_p}{K_3}}{x_3} = \frac{\frac{1}{K_3}}{\left[\frac{1+K_1K_2}{K_1K_3}\right]p+1}$$

Cancel $K_3$,

(10) $$\frac{e_p}{x_3} = \frac{1}{\left[\frac{1+K_1K_2}{K_1K_3}\right]p+1}$$

Let $$\frac{1+K_1K_2}{K_1K_3} = Tm \text{ or the time constant of the system}$$

(11) $$\frac{e_p}{x_3} = \frac{1}{Tmp+1}$$

The transfer function of a low pass filter is

(12) $$K_4 = \frac{1}{Tcp+1}$$

where $K_4$ is the transfer function, $Tc$ is the time constant of the filter, and $p$ is the Laplace transform operator.

From inspection it is seen that Equations 12 and 11 are of the same form and therefore it has been shown mathematically that a servomotor acts as a low pass filter.

In a similar manner it can be shown that the output of generator 23 is equivalent to a high pass filter.

Reference may be made to pages 114 and 173 of Servo Mechanism and Regulation System Design, Chestnut and Mayer, for a more comprehensive study.

The function of the filters 67 and 68 are performed by the servo systems in the $x$ computer which are analogous thereto. The motor 22, for example, receives signals proportional to $x_1$ and $\dot{x}_2$ and a velocity signal from the servo rate generator 23 and a displacement signal from the potentiometer 24. The shaft speed of a servo mechanism is analogous to current and it may be shown that the electrical output of the rate generator 23 is analogous to the back voltage across resistor R of the filter 67. The electrical feedback from the potentiometer is analogous to the back voltage across the condenser C of the filter 67. Thus the servo system simulates the action of filter 67. Hence, the rate generator 23 voltage could be applied along with another signal proportional to $x_1$ to a similar servo with rate and displacement feedback simulating filter 68. Potentiometer voltage from the second servo would represent the desired coordinate $x_3$.

Instead of feeding the velocity signal into motor 37 electrically, better results are obtained if the feed is made mechanically. It is to be noted that motor 37 receives feedback signals from potentiometer 41, the rate generator 38, and the radio signal $x_1$. Thus the second servo system receives all the necessary electrical signals except a velocity signal from the first servo system. Hence, motor 37 runs at the required speed less the speed of motor 22. If the speed of motor 22 is added to that of motor 37 by means of a differential gear, an output of the corrected $x_3$ will be obtained from the potentiometer 41. The differential gear 39 performs this function. The output from potentiometer 41 may be furnished to a meter 18 which indicates to the pilot his $x$ position. The information may be supplied to an automatic course computer, if desired.

The output of potentiometer 41 from the second servo system is free of the wind error which was present in the output of potentiometer 24. Hence the difference between the potentiometers 24 and 41 is proportional to the $x$-component of wind, and because of the particular differential gear arrangement wherein the output of motor 22 is added to the output of motor 37, the wind error is proportional to the shaft position of motor 37. Thus the wind may be obtained from the potentiometer 49 driven by the shaft from the motor 37.

Thus it is seen that the $x$-tracker of this invention when supplied radio information proportional to the $x$-coordinate and information from aircraft instruments proportional to the $x$-air speed, obtains a corrected and filtered resultant $x$-coordinate. A $y$-tracker may be built which is identical to the $x$-tracker and gives a corrected $y$-position. The only difference in the two trackers is that the radio information and flight instrument information furnishes the $y$-components of displacement and air speed, respectively, rather than the $x$-components. The $y$-components may be obtained directly from the resolver 12 and calculator 34. Thus the pilot has available at all times his geographic position and also the $x$ and $y$ velocity components of the wind which may be presented to him as a resultant wind by combining these two signals.

Figure 3:
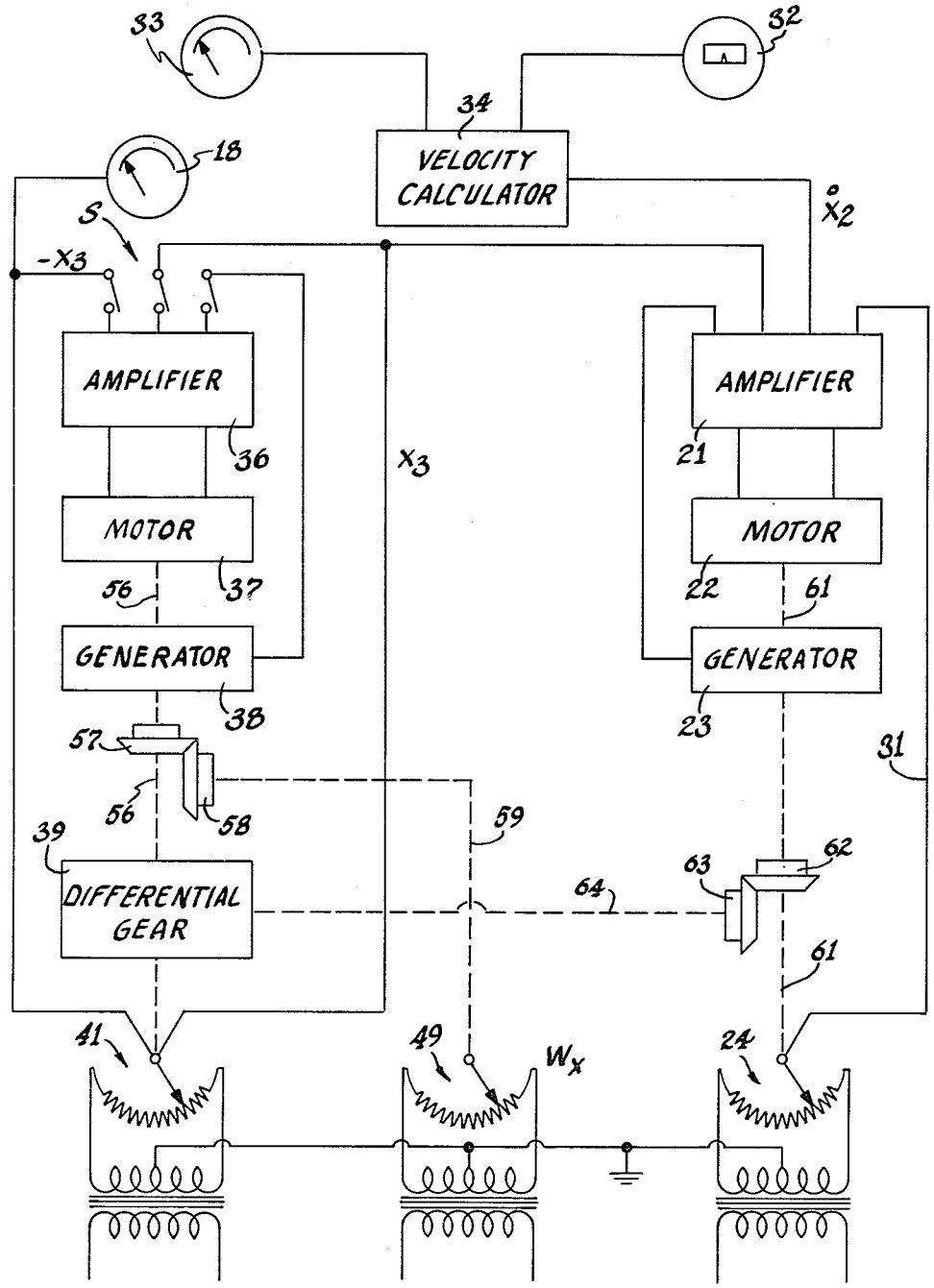
Figure 3 is a schematic view of the $x$ computer of this invention in use as a dead reckoning instrument during an interval when the previously available radio information has failed.

Oftentimes good radio information is not available. When this condition exists the tracker of this invention may be used as a dead reckoning device. To accomplish this, as best shown in Figure 3, the output position signal $x_3$ is substituted for the radio-derived position signal $x_1$ in the input of amplifiers 21 and 36 when switch S is closed. Amplifier 21 now receives two pairs of signals. The first pair consists of the velocity signal $\dot{x}_2$ from velocity calculator 34 and the negative velocity feedback signal from generator 23. The action of these two signals alone would be to make motor 22 run at a speed proportional to the velocity signal $\dot{x}_2$. Amplifier 21 also receives a second pair of signals consisting of the signal $x_3$ from potentiometer 41 and the negative position signal from 24. The difference in these two signals is proportional to the wind correction signal, as from potentiometer 49. If the system has previously been tracking a radio signal $x_1$, this wind correction signal will cause motor 22 to run at a speed representing true ground speed rather than air speed, as long as the wind does not change. Amplifier 36 now receives $-x_3$ from its normal inverse feedback connection and $x_3$ fed in the positive sense to replace the radio-derived signal $x_1$. Since the only other signal fed to amplifier 36 is the velocity feedback signal from generator 38, motor 37 does not run, and switch S might as well be open. Potentiometer 41 is now driven by motor 22 through differential gear 39 at a speed corresponding to the true ground speed, with wind correction "remembered" from the time it was tracking a radio signal.

Figure 4:
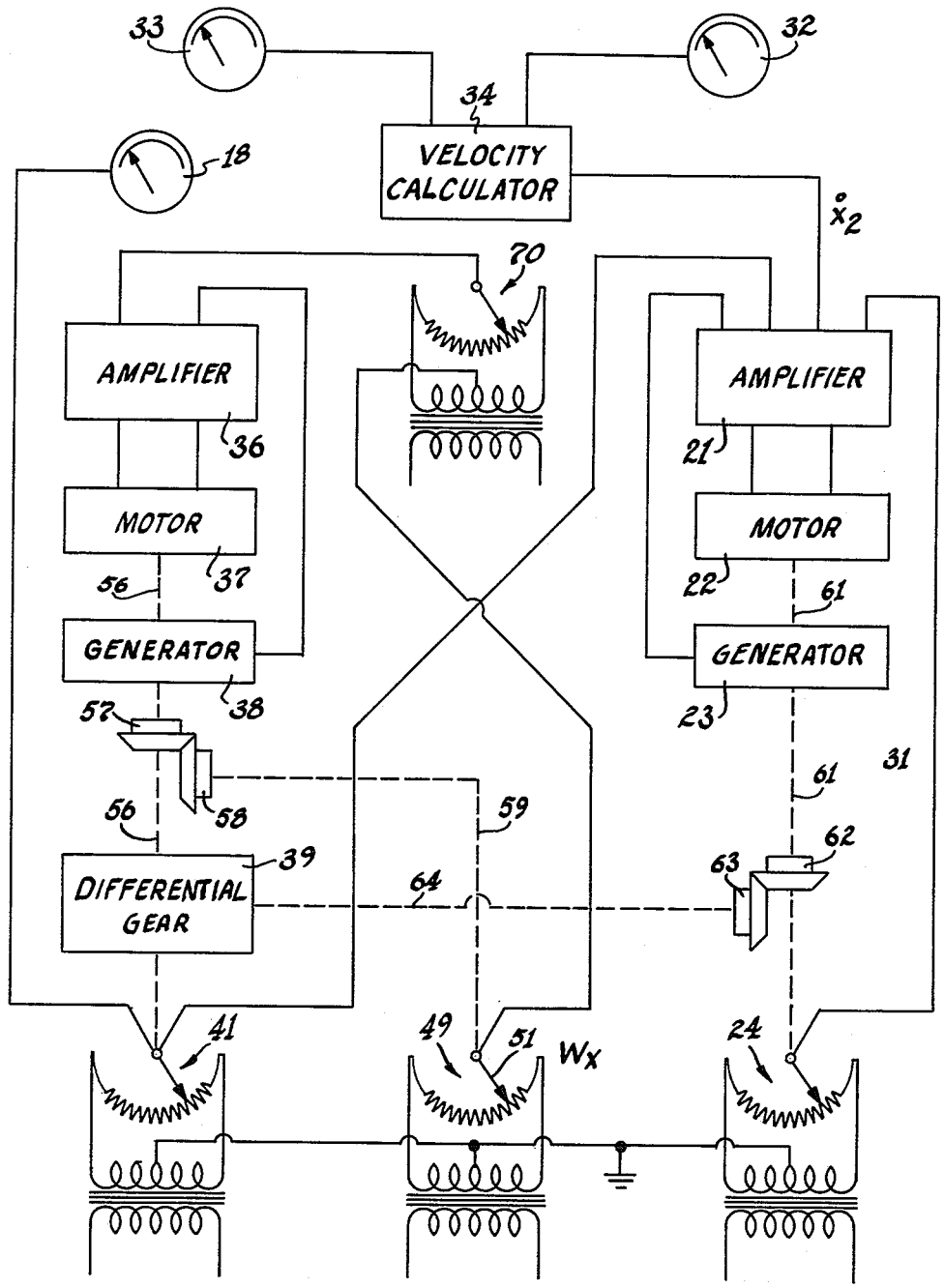
Figure 4 is a schematic view of the $x$ computer of this invention in use as a pure dead reckoning instrument.

In addition to tracking from radio and automatic dead reckoning, the tracker may be used for manual dead reckoning when no radio guidance has been available, but the wind direction and velocity are known. This circuit is shown in Figure 4. The wind may be available from broadcast sequence reports, for example. The known wind should be resolved into its $x$ and $y$ components and the respective components set manually on the $x$ potentiometer 70 and the corresponding $y$ potentiometer. Amplifier 36 now receives the difference between the signals from potentiometer 49 and the wind signal from the manually set potentiometer 70 in addition to the inverse velocity signal from generator 38. Hence motor 37 runs until the voltage from 49 equals that from potentiometer 70. Amplifier 21 receives the air speed signal $\dot{x}_2$ and a signal from generator 23 in addition to the difference between the signals from potentiometers 24 and 41 which is equal to the signal from potentiometer 49 and constitutes a wind correction signal. Hence motor 22 runs at a speed corresponding to the $x$ component of air speed plus the $x$ component of wind, which is the $x$ component of ground speed. The same result could have been achieved in the usual manner by feeding the signal from 70 to 21 instead of the signals from 24 and 41 and stopping motor 37. The advantage of the arrangement shown in Figure 4 lies in the fact that the wind correction is contained in the difference between potentiometers 24 and 41 for both dead reckoning as in Figure 4 and automatic tracking as in Figure 2, making for smoother transition from one mode of operation to another.

The operation of the fundamental circuit of this invention, as shown in Figure 2, may be explained on an alternative basis which may aid in disclosing the invention more clearly. If amplifier 21 were fed only the radio derived position signal $x_1$ and feedback signals from 23 and 24, potentiometer 24 would track the average $x$ component of ground position but would lag behind the true position by an amount proportional to the $x$ component of ground speed. To eliminate this lag, a signal proportional to the $x$ component of air speed, $\dot{x}_2$, is added to the input of 21. If there were no wind so that the air speed is the true ground speed, the tracking errors would then be removed. However, the signal $\dot{x}_2$ used to eliminate this tracking error contains an error proportional to the wind speed. Hence the setting of potentiometer 24 contains a fixed error proportional to the wind speed. The voltage from potentiometer 41 which is also driven by motor 22 through differential gear 39 is now again compared with the radio-derived position signal $x_1$ in amplifier 36 so that motor 37 operates until the voltage from 41 is equal to the average value of $x_1$, thereby removing this fixed error. That is, the sluggishness of motor 22 in following the signal $x_1$ serves to smooth out short term fluctuations in $x_1$ but introduces a lag proportional to the rate of change of $x_1$. The signal $\dot{x}_2$ removes the variable part of this lag but a fixed part, proportional to wind speed, remains. Motor 37 operates to mechanically add to the shaft position of motor 22, through a differential gear, until this fixed lag is removed.

The switching arrangement for changing from radio tracking, to automatic dead reckoning, to manual dead reckoning has not been shown because to do so presents a confusing schematic. Instead three drawings illustrating the three different situations are presented. As switching arrangements are well known to those skilled in the art, it will be presumed that the reader can readily see how to change automatically or manually to any of the three arrangements.

It is seen that this invention provides an automatic position tracker which will utilize the best information available to it. When no radio is available dead reckoning will be accomplished either by "remembering" position and wind derived when radio was available, or by utilizing manually set-in information giving a known or estimated wind and position.

Although this invention has been described with respect to particular embodiments it is to be understood that different servo connections may be made which give an equivalent result.

I claim:
1. Apparatus for computing the position of a moving body relative to a pair of reference axes comprising, radiant energy receiving means carried on said body and receiving energy from transmitters located at known geographic positions, a resolver receiving an output from said receiving means and resolving it into a pair of coordinate signals representing the coordinates of the body with respect to a reference system on the ground, angle and velocity measuring means carried on said body, an $x$ computer receiving one of said coordinate signals and a first velocity signal from said angle and velocity measuring means, a $y$ computer receiving the other of said coordinate signals and a second velocity signal from the angle and velocity measuring means, and said $x$ and $y$ computers computing derived coordinate signals indicating the position of the body by selecting the low frequency components of said derived coordinate signals from said coordinate signals and by selecting the high frequency components of said derived coordinate signals from said velocity signals.

2. In apparatus for computing the position of a moving aircraft which carries flight instruments and radiant energy receiving means, position calculating apparatus comprising, a resolver receiving an output from the receiving means and resolving it into $x$ and $y$ components of position relative to a pair of reference axes, an air speed computer translating signals from the flight instruments into the $x$ and $y$ components of air velocity, an $x$ computer receiving the $x$ components of position and air velocity and deriving a corrected $x$ coordinate by selecting the low-frequency components of said $x$ coordinate from the $x$ component of position and the high frequency components of the $x$ output from the $x$ component of velocity, and a $y$ computer receiving the $y$ components of position and air velocity and deriving a $y$ output proportional to the $y$ coordinate of the aircraft by selecting the low frequency components of the $y$ output from the $y$ component of position and the high frequency components of the $y$ output from the $y$ component of velocity.

3. In a system according to claim 2 wherein said $x$ computer comprises, a first servomotor mechanically connected to a first rate generator and receiving an electrical output therefrom, a first potentiometer mechanically connected to said first motor and supplying an electrical output thereto, a second servomotor mechanically connected to a second rate generator and receiving an electrical output therefrom, a differential gear train mechanically connected to the second motor by means of a first shaft, a second potentiometer connected to said differential gear train by means of a second shaft and supplying an electrical output to said second motor, said differential gear train connected to the first motor by means of a third shaft, said first and second motors receiving an electrical signal proportional to the $x$ component of position from the resolver, and said first motor receiving a signal proportional to the $x$ component of velocity relative to the surrounding air from the air speed computer.

4. Apparatus for computing the position of a moving body comprising, radio receiving means receiving radiant energy from transmitters at known geographic positions, a resolver receiving the output of said receiving means to resolve it into $x$ and $y$ coordinate signals relative to a pair of reference axes, a first servomechanism receiving the $x$ signal from the resolver, a second servomechanism receiving the $x$ signal from the resolver, an air speed calculator deriving the $x$ and $y$ air speeds and the first servomechanism receiving the $x$ air speed signal therefrom, a differential gear train receiving shaft inputs from the first and second servomechanisms and giving a shaft output equal to the sum of the shaft inputs which is connected to an $x$ potentiometer that gives an output voltage proportional to the true $x$ position of the moving body, and said $x$ potentiometer furnishing an input to said second servomechanism.

5. In a system for tracking by dead reckoning the position of a moving aircraft which carries flight instruments and a velocity calculator for translating signals from the flight instruments into $x$ and $y$ components of air velocity during a period when no radio position information is available and immediately following a period when radio information has been available, an $x$-computer comprising, a first servomotor mechanically connected to a first rate generator and receiving an electrical feedback therefrom, a first potentiometer mechanically connected to said first motor and furnishing an electrical feedback thereto, a second servomotor mechanically connected to a second rate generator and receiving an electrical feedback therefrom, a differential gear train mechanically connected to the second motor by means of a first shaft, a second potentiometer connected to said differential gear train by means of a second shaft and supplying a first electrical output to said second motor, said differential gear train connected to the first motor by means of a third shaft, and said second potentiometer supplying a second electrical output which is out of phase with said first output to said first and second motors, and said first motor receiving a signal from the resolver proportional to the $x$ component of velocity relative to the surrounding air.

6. In a system for tracking by dead reckoning the position of a moving body which carries flight instruments and a velocity calculator for translating signals from the flight instruments into $x$ and $y$ components of air velocity during a period when no radio information is available, an $x$-computer comprising, a first servomotor receiving the $x$ output of the velocity calculator and mechanically connected to a first rate generator and receiving an electrical feedback therefrom, a first potentiometer mechanically connected to said first motor and furnishing an electrical feedback thereto, a second servomotor mechanically connected to a second rate generator and receiving an electrical feedback therefrom, a differential gear train receiving a mechanical input from said first and second motors, a second potentiometer furnishing an electrical input to the first motor and receiving a mechanical input from the gear train equal to the sum of the inputs from the first and second motors, a third potentiometer mechanically connected to said second motor, a fourth potentiometer connected in series with said third potentiometer and manually adjusted at the initial time to the $x$ component of the known wind, and the combined outputs of said third and fourth potentiometers furnished to the second motor.

References Cited in the file of this patent

UNITED STATES PATENTS

| | | |
|---|---|---|
| 2,066,949 | Ruiz | Jan. 5, 1937 |
| 2,434,270 | Holden | Jan. 13, 1948 |
| 2,467,179 | Andersen, Jr. | Apr. 12, 1949 |
| 2,472,129 | Streeter, Jr. | June 7, 1949 |
| 2,530,428 | Gray | Nov. 21, 1950 |